(12) United States Patent
Cheng et al.

(10) Patent No.: US 7,135,090 B2
(45) Date of Patent: Nov. 14, 2006

(54) FPD ENCAPSULATION APPARATUS AND METHOD FOR ENCAPSULATING THE SAME

(75) Inventors: Tung-Sheng Cheng, Hsinchu (TW); Yi-Fan Su, Changhua (TW); Yen-Hua Lin, Hsinchu (TW)

(73) Assignee: RiTdisplay Corporation, Hsinchu (TW)

( * ) Notice: Subject to any disclaimer, the term of this patent is extended or adjusted under 35 U.S.C. 154(b) by 326 days.

(21) Appl. No.: 10/691,617

(22) Filed: Oct. 24, 2003

(65) Prior Publication Data

US 2004/0089397 A1    May 13, 2004

(30) Foreign Application Priority Data

Oct. 25, 2002    (TW) ................................ 91125333 A

(51) Int. Cl.
*B29C 65/14*    (2006.01)
(52) U.S. Cl. ................... 156/379.8; 156/381; 156/382; 445/70; 445/73
(58) Field of Classification Search ................ 156/381, 156/382, 285, 286
See application file for complete search history.

(56) References Cited

U.S. PATENT DOCUMENTS

| | | | | |
|---|---|---|---|---|
| 5,106,441 A | * | 4/1992 | Brosig et al. ................ | 156/104 |
| 5,254,205 A | * | 10/1993 | Tsutsumi et al. ............ | 156/538 |
| 7,022,199 B1 | * | 4/2006 | Lee et al. ..................... | 156/106 |
| 2003/0178133 A1 | * | 9/2003 | Lee et al. ..................... | 156/285 |
| 2003/0178134 A1 | * | 9/2003 | Muramoto et al. .......... | 156/285 |
| 2004/0050485 A1 | * | 3/2004 | Speer et al. .............. | 156/272.2 |
| 2004/0055701 A1 | * | 3/2004 | Speer et al. ................. | 156/285 |
| 2006/0027318 A1 | * | 2/2006 | Hashizume et al. ......... | 156/285 |

FOREIGN PATENT DOCUMENTS

| | | | |
|---|---|---|---|
| WO | WO 02/053357 A1 | * | 7/2001 |
| WO | WO 02/054398 A1 | * | 7/2001 |

\* cited by examiner

*Primary Examiner*—Jessica Rossi
(74) *Attorney, Agent, or Firm*—Jiang Chyun IP Office

(57) ABSTRACT

An FPD encapsulation apparatus at least comprises a chamber and a pressing mechanism. In this case, the chamber has an airtight space to provide a low-pressure environment, and the low-pressure environment is located inside the airtight space. The pressing mechanism is disposed within the chamber, and the pressing mechanism is operated in the low-pressure environment for pressing a second substrate to bind a first substrate and the second substrate. Furthermore, a method for encapsulating an FPD is disclosed. The method comprises providing a first substrate, forming an adhesive on the first substrate, providing a second substrate to align the first substrate and face to the adhesive, providing a low-pressure environment for the first and second substrates, and binding the first and second substrates to form the FPD.

6 Claims, 9 Drawing Sheets

FPD ENCAPSULATION APPARATUS AND METHOD FOR ENCAPSULATING THE SAME

This nonprovisional application claims priority under 35 U.S.C. § 119(a) on patent application Ser. No. 091125333 filed in TAIWAN on Oct. 25, 2002, which is herein incorporated by reference.

BACKGROUND OF THE INVENTION

1. Field of Invention

The invention relates to a display encapsulation apparatus and method for encapsulating a display and, in particular, to a flat-panel display (FPD) encapsulation apparatus and method for encapsulating an FPD.

2. Related Art

Accompanying the development of electronic technology, displays have become lightweight and high efficiency, and are wildly spread. The dimensions of displays have decreased, especially flat-panel displays (FPDs) such as liquid crystal displays (LCDs) and organic light-emitting displays (OLEDs). OLEDs possess the advantages of self-emissive, full viewing angle, high power efficiency, easily manufactured, low cost, rapid response, and full color. Hence, OLEDs are rapidly becoming a major choice for flat panel display technology in the future. Those skilled in the art should know that OLEDs utilize the self-emissive properties of certain organic functional materials to achieve the object of display.

In general, an FPD is consisting of an electroluminescent substrate and a glass substrate. With reference to FIG. 1, an encapsulation process for binding the electroluminescent substrate and glass substrate includes the following steps of: providing a glass substrate (step 101), applying a adhesive on the glass substrate (step 102), providing an electroluminescent substrate (step 103), and pressing the glass substrate and electroluminescent substrate to bind the glass substrate and electroluminescent substrate (step 104).

The above mentioned encapsulation process is performed in an FPD encapsulation apparatus. Referring to FIG. 2A, a conventional FPD encapsulation apparatus 2 includes a chamber 21, a curing device 22, and a pressing mechanism 23. The chamber 21 has an airtight space, which is filled with inert gas to decrease moisture and oxygen. Thus, the electroluminescent substrate could be prevented from the moisture and oxygen, and have improved durability. The curing device 22 includes a supporting portion 221 and an UV light source 223. The supporting portion 221 is a quartz plate and is used to support the glass substrate. The UV light source 223 is located under the supporting portion. The pressing mechanism 23 is provided opposite to the curing device 22. One end of the pressing mechanism 23 is located in the chamber 21 and is movable. The electroluminescent substrate is attached to this end of the pressing mechanism 23, and is also movable in the chamber 21.

Referring to FIG. 2B, in step 101, a glass substrate 31 is placed on the supporting portion 221. In this case, a robot arm (not shown) is usually used to transfer the glass substrate 31 into the chamber 21, and the glass substrate 31 is positioned on the supporting portion 221.

With reference to FIG. 2C, in step 102, a dispensing mechanism (not shown) is employed to apply an adhesive 32 on the glass substrate 31. The adhesive 32, which is usually made of epoxy, is formed as a closed loop or frame or has a gap for air venting. As shown in FIG. 3A, the adhesive 32 is formed as a closed loop or frame on the glass substrate 31 to surround a portion of the FPD to be protected. As shown in FIG. 3B, the adhesive 32 is formed on the glass substrate 31 with one gap 321 or more. Thus, when pressing the glass substrate and/or electroluminescent substrate to bind the substrates, gas positioned between the substrates can be vented out through the gap 321. The gap 321 may then be closed during pressing the substrates.

Alternatively, the adhesive 32 can be dispensed on the glass substrate 31 with an additional dispensing apparatus. The glass substrate 31 with the adhesive 32 is then moved into the chamber 21 and positioned on the supporting portion 221. After the glass substrate 31 with the adhesive 32 is positioned on the supporting portion 221, the UV light source 223 emits an UV light beam. The UV light beam passes through the supporting portion 221 and the glass substrate 31, and then pre-cures the adhesive 32.

As shown in FIG. 2D, in step 103, the electroluminescent substrate 33 is attached to one end of the pressing mechanism 23. In this case, an additional robot arm is employed to move the electroluminescent substrate 33 into the chamber 21 and position the electroluminescent substrate 33 at one end of the pressing mechanism 23. This end of the pressing mechanism 23 is a suction plate for holding the electroluminescent substrate 33. In addition, this end of the pressing mechanism 23 can be a chuck for chucking the electroluminescent substrate 33.

Referring to FIG. 2E, in step 104, the pressing mechanism 23 moves down to press the glass substrate 31 and/or the electroluminescent substrate 33, and the glass substrate 31 and electroluminescent substrate 33 are then bound to each other via the adhesive 32. In this case, the electroluminescent substrate 33 aligns with the glass substrate 31 in advance, and the pressing mechanism 23 then moves by a screw or a pneumatic system. Before the glass substrate 31 and the electroluminescent substrate 33 are bound, the chamber 21 may be filled with inert gas so as to prevent moisture and oxygen from being encapsulated between the glass substrate 31, adhesive 32, and electroluminescent substrate 33.

After the glass substrate 31 and electroluminescent substrate 33 are bound, an UV light source 223 emits an UV light beam passing through the supporting portion 221 and glass substrate 31 to cure the adhesive 32.

During the encapsulating process of the glass substrate 31 and the electroluminescent substrate 33, the adhesive 32 is pressed, resulting in that the space between the glass substrate 31, adhesive 32, and electroluminescent substrate 33 decreases. Thus, the pressure of the space increases accordingly. In particular, when performing high temperature test, the residual gas in the space will be heated and expand. As a result, the pressure of the space becomes larger, which destroys the encapsulated structure of the glass substrate 31, adhesive 32, and electroluminescent substrate 33. Therefore, the durability of the FPD decreases.

In addition, during the process of pressing the glass substrate 31 and electroluminescent substrate 33, the space between the glass substrate 31, adhesive 32, and electroluminescent substrate 33 becomes smaller and smaller. Thus, the gas in the space may be vented out through the adhesive 32, resulting in bubbles or worm holes in the adhesive 32. The worm holes are the moving traces of the bubbles. Accordingly, the adhesive 32 may not stop the external moisture and oxygen properly. In other words, the external moisture and oxygen may facilely pass through the adhesive 32 having worm holes or bubbles, and the manufactured FPD will be damaged.

Since the adhesive 32 usually contains volatile materials, such as organic solvents, the volatile materials may be released from the adhesive 32. The FPD may suffer from the volatile materials. For example, the volatile materials may destroy the organic functional materials of the electroluminescent substrate 33. Thus, the dark spots of the FPD occur, and the durability of the FPD decreases.

Therefore, it is an important subjective of the invention to provide an FPD encapsulation apparatus and encapsulating method to control the pressure of the space between the glass substrate 31, adhesive 32, and electroluminescent substrate 33, and to avoid the bubbles or worm holes in the adhesive 32. Furthermore, the residual volatile materials, which include harmful gas, can be removed.

SUMMARY OF THE INVENTION

In view of the above-mentioned problems, an objective of the invention is to provide an FPD encapsulation apparatus and method for encapsulating the FPD, which can control the pressure of the space between the glass substrate, adhesive, and electroluminescent substrate.

It is another objective of the invention to provide an FPD encapsulation apparatus and method for encapsulating the FPD, which can avoid the formations of bubbles or worm holes within the adhesive.

It is an additional objective of the invention to provide an FPD encapsulation apparatus and method for encapsulating the FPD, which can remove the residual volatile materials or harmful gas.

To achieve the above-mentioned objective, an FPD encapsulation apparatus of the invention at least comprises a chamber and a pressing mechanism. In the invention, the chamber has an airtight space to provide a low-pressure environment, and the low-pressure environment is located inside the airtight space. The pressing mechanism is disposed within the chamber, and the pressing mechanism is operated in the low-pressure environment. The chamber comprises a housing, a curing device, and a vacuum device. The housing and curing device form an operating space, in which a first substrate and a second substrate are provided. The second substrate connects to one end of the pressing mechanism, which connects to the housing. Thus, the second substrate can move up and down according to the movement of the pressing mechanism. The curing device has a supporting portion for supporting the first substrate. The vacuum device is used to decrease the pressure of the operating space to form the low-pressure environment for binding the first and second substrates.

Furthermore, a method for encapsulating an FPD of the invention comprises providing a first substrate, forming an adhesive on the first substrate, providing a second substrate, providing a low-pressure environment for the first and second substrates, and binding the first and second substrates to form the FPD under a low-pressure environment. In this invention, the second substrate is aligned with the first substrate in advance, wherein the second substrate faces one surface of the first substrate formed with the adhesive. The second substrate is then pressed to bind the first and second substrates. In addition, the method for encapsulating an FPD further comprises pre-curing the adhesive after the adhesive is formed, and curing the adhesive after the first and second substrates are bound.

As mentioned above, since the invention previously provides a low-pressure environment and then binds the first and second substrates, the pressure between the first substrate, adhesive and second substrate can be controlled efficiently. Thus, the high pressure caused by air expansion can be prevented, so that the encapsulated structure of the glass substrate, adhesive, and electroluminescent substrate would not be destroyed. Furthermore, the bubbles or worm holes would not be obtained, so that the external moisture and oxygen would not pass through the adhesive easily. As a result, the manufactured FPD would not be damaged by the external moisture or oxygen. Moreover, the invention can vent residual harmful materials to prevent the manufactured FPD from damaged by the harmful volatile materials. Thus, the dark spots can be prevented.

BRIEF DESCRIPTION OF THE DRAWINGS

The invention will become more fully understood from the detailed description given herein below illustrations only, and thus is not limitative of the present invention, and wherein.

DETAILED DESCRIPTION OF THE INVENTION

The FPD encapsulation apparatus and method for encapsulating the FPD according to preferred embodiments of the invention will be described herein below with reference to the accompanying drawings, wherein the same reference numbers refer to the same elements.

Figure 4:
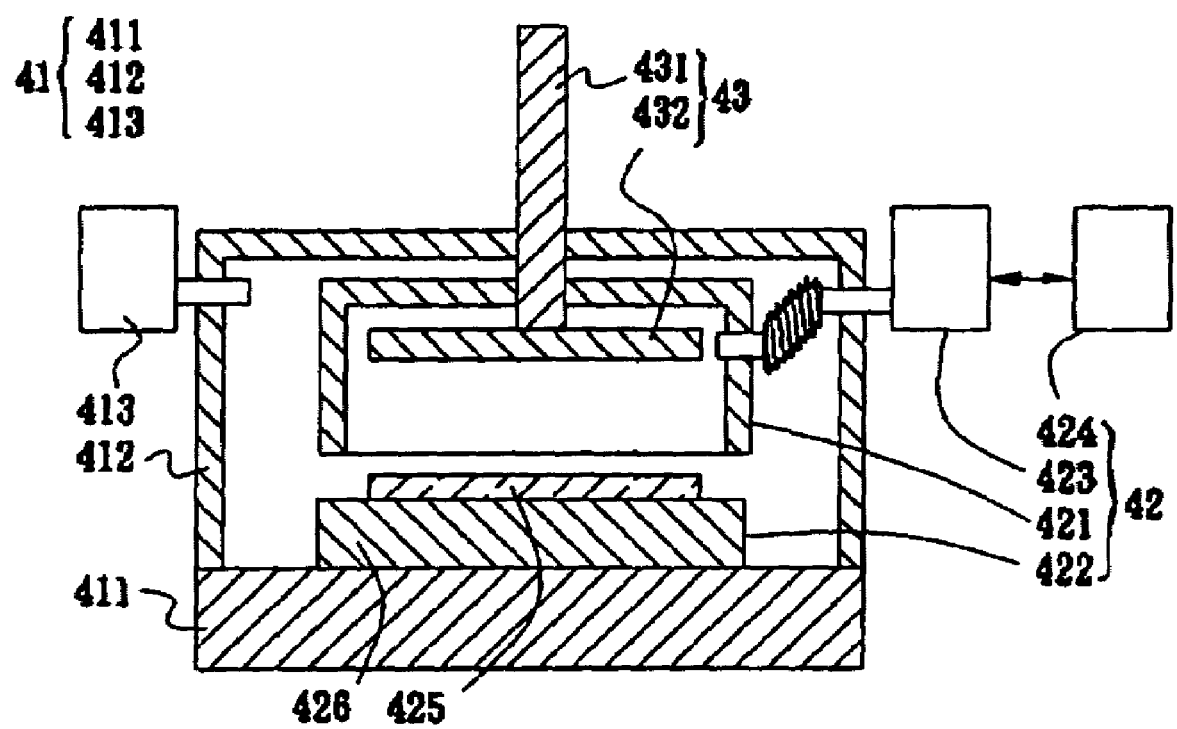
FIG. 4 is a schematic illustration showing an FPD encapsulation apparatus according to a preferred embodiment of the invention.

With reference to FIG. 4, an FPD encapsulation apparatus 4 according to a preferred embodiment of the invention comprises a chamber 41 and a pressing mechanism 43. The chamber 41 has an airtight space to provide a low-pressure environment 42, The chamber 41 comprises a basement 411, a shielding 412 and an atmosphere controlling mechanism 413. In the embodiment, the basement 411 and the shielding 412 form an airtight space, and the materials thereof can stop UV light. Thus, UV light would not pass through the basement 411 and the shielding 412. The atmosphere controlling mechanism 413 controls and inputs an inert gas into the airtight space, so that the moisture and oxygen of the airtight space are decreased according to the inert gas. Thus, the manufactured FPD would not be damaged by the moisture and oxygen during the encapsulation process. The mentioned inert gas is, for example, nitrogen.

The low-pressure environment 42 is located in the airtight space for the subsequent pressing process. In the present embodiment, the chamber 41 comprises a housing 421, a curing device 422, a vacuum device 423, and a controlling device 424. The housing 421 and the curing device 422 form an operating space. The curing device 422 comprises a supporting portion 425 and an UV light source 426. The supporting portion 425 is usually made of quartz for supporting a flat substrate. The UV light source 426 emits an UV light beam, which can pre-cure or cure an adhesive. The vacuum device 423 can vent air from the operating space consisting of the housing 421 and curing device 422, resulting in a low-pressure environment. The low-pressure environment is, for example, less than 1 atmosphere. The vacuum device 423 may include a conventional vacuum pump and an extensible vacuum pipe. The controlling device 424 is electrically connected to the vacuum device 423 for controlling the vacuum device 423 to adjust the pressure of the operating space. In details, the controlling device 424 receives a predetermined pressure value provided form a user, and enables the vacuum pump of the vacuum device 423. When the actual pressure of the operating space reaches the predetermined pressure value, the vacuum pump stops.

Those who are skilled in the art should know that by using the vacuum device 423 to vent air out of the operating space, the low-pressure environment could be obtained and the harmful volatile materials of the adhesive could he exhausted.

The pressing mechanism 43 is disposed within the chamber 41, and the pressing mechanism 43 is operated in the low-pressure environment 42. In the current embodiment, the pressing mechanism 43 comprises an up/down device 431, and an attaching portion 432. The attaching portion 432 is positioned in the low-pressure environment 42 and is set on one end of the up/down device 431. When the up/down device 431 moves up and down, the attaching portion 432 is moved up and down correspondingly. The up/down device 431 can be a ball bearing screw or a pneumatic shaft. The attaching portion 432 can be a mechanical chuck for chucking the flat substrate. Alternatively, the attaching portion 432 can be a vacuum suction plate for holding a flat substrate. In this embodiment, the supporting portion 425 supports a glass substrate and the attaching portion 432 holds an electroluminescent substrate. In addition, the supporting portion 425 may support an electroluminescent substrate and the attaching portion 432 may hold a glass substrate.

Figure 1:
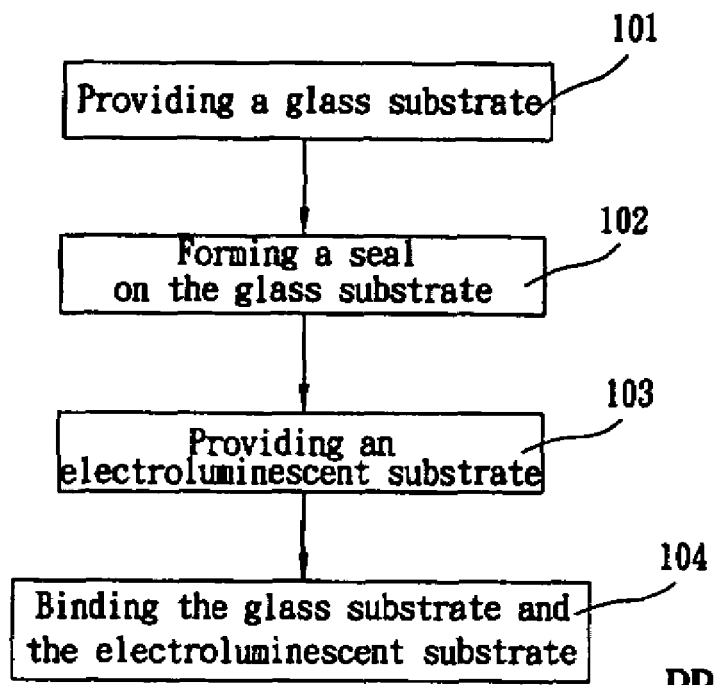
FIG. 1 is a flow chart showing a conventional method for encapsulating an FPD.
Figure 2A:
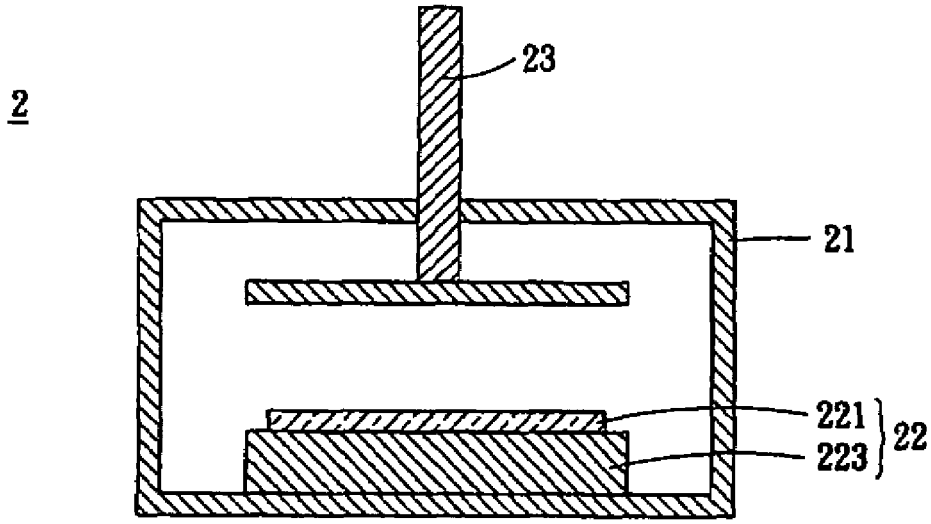
FIG. 2A is a schematic illustration showing a conventional FPD encapsulation apparatus.
Figure 2B:
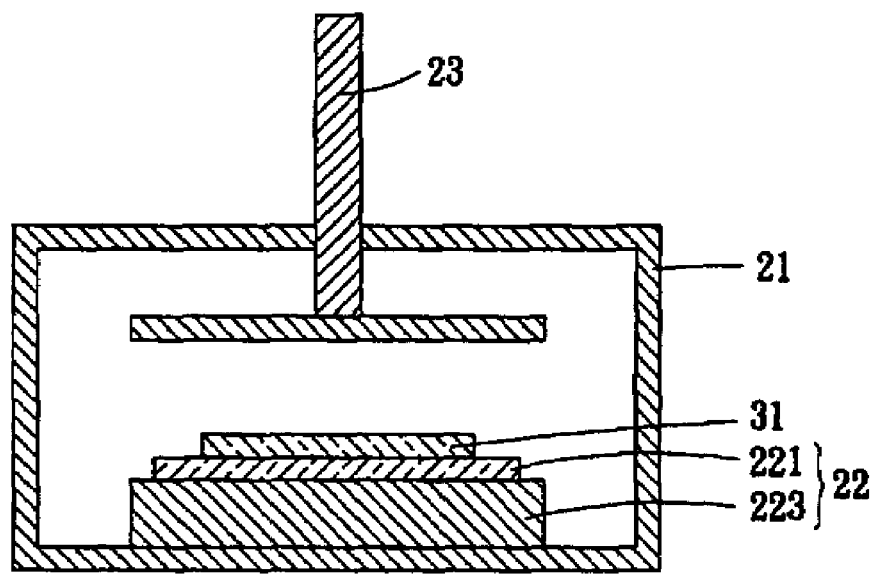
FIGS. 2B to 2E are schematic illustrations showing the conventional FPD encapsulation apparatus of FIG. 2A performing the method of FIG. 1.
Figure 2C:
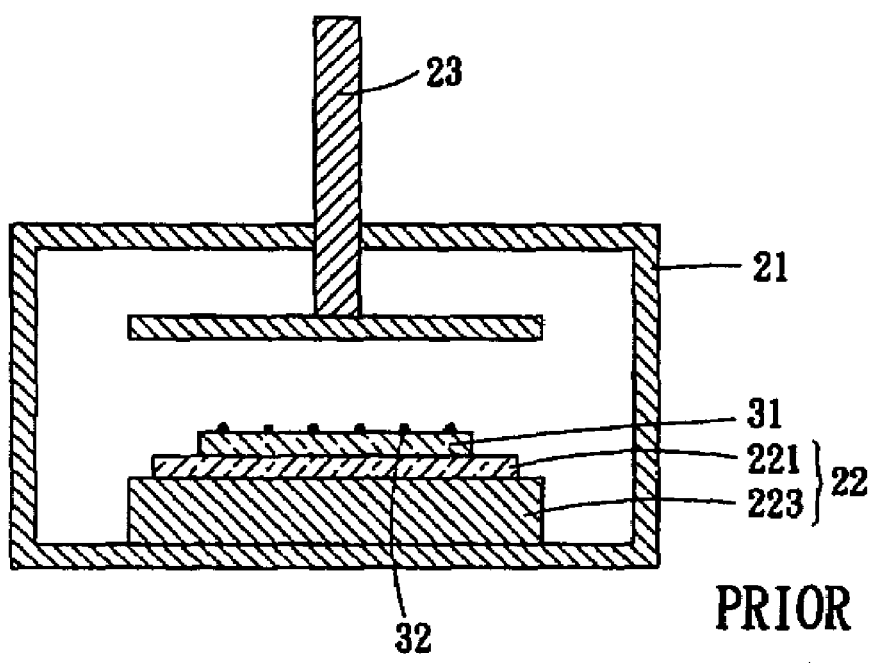
Figure 2D:
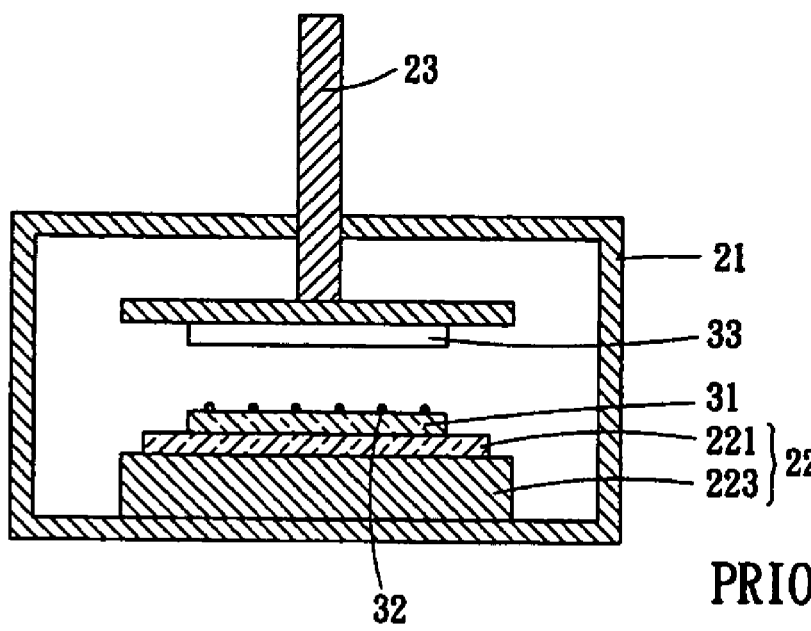
Figure 2E:
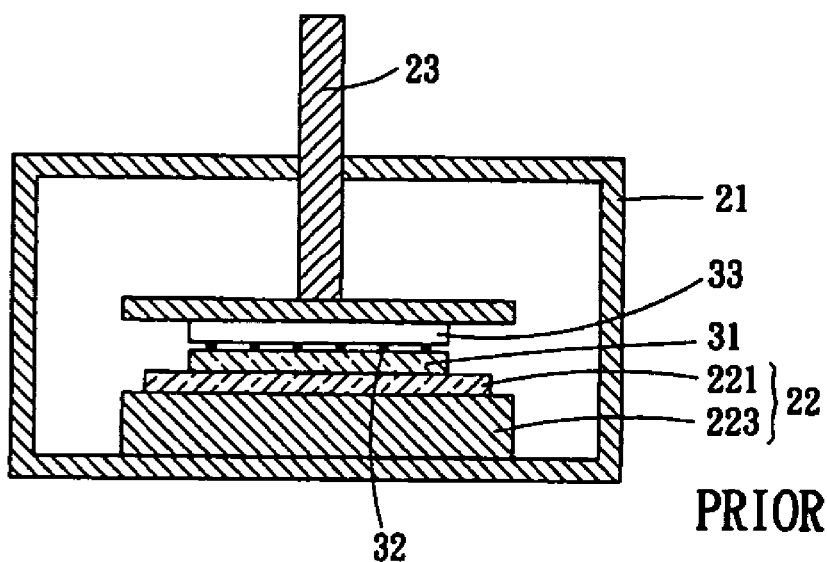
Figure 3A:
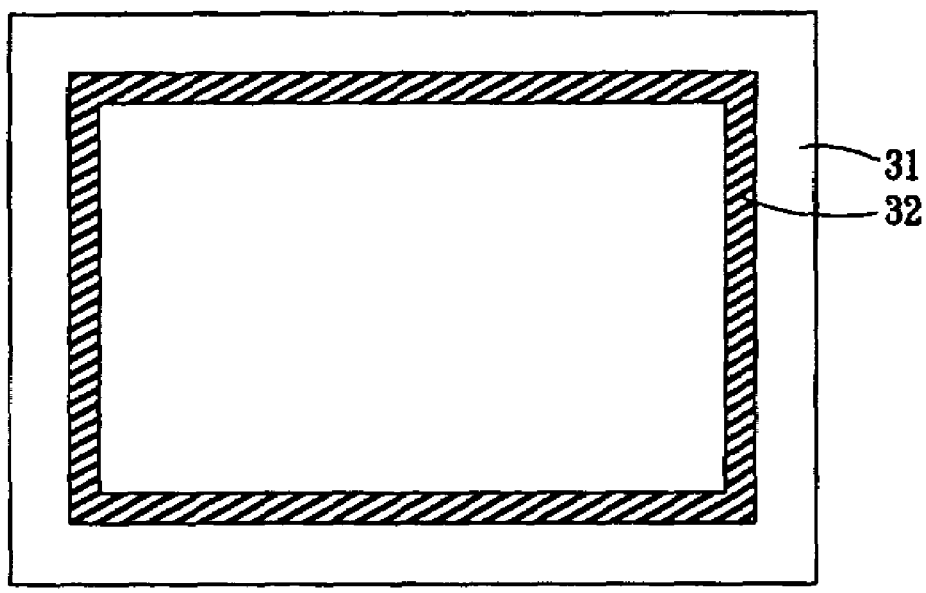
FIG. 3A is a schematic illustration showing a glass substrate and an adhesive, wherein the adhesive is a closed loop or frame.
Figure 3B:
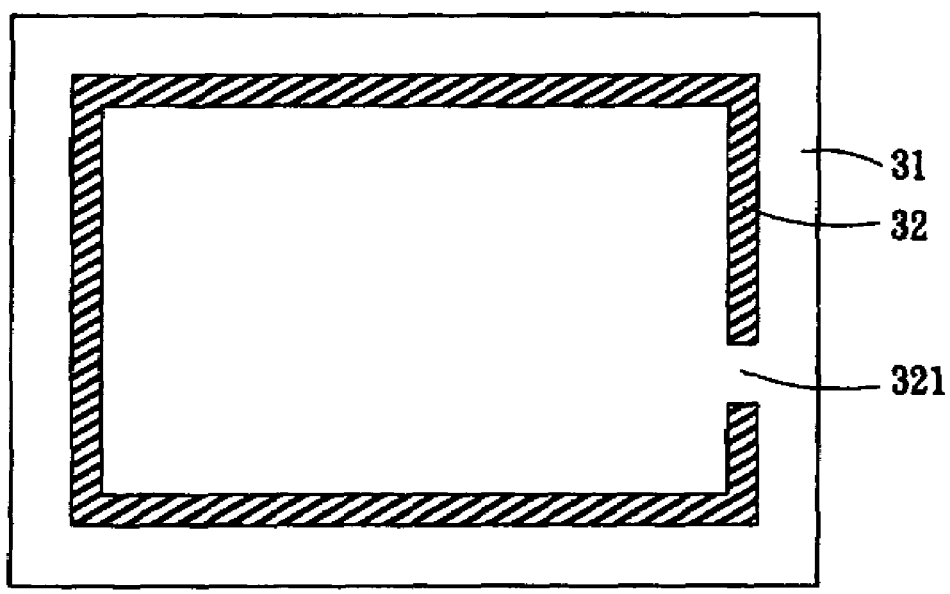
FIG. 3B is a schematic illustration showing a glass substrate and an adhesive, wherein the adhesive has a gap for air venting.

The FPD encapsulation apparatus 4 may further comprise a dispensing mechanism (not shown), which is used for dispensing the adhesive on the flat substrate placed on the supporting portion 425. In the present embodiment, the adhesive can be a closed loop or frame or have a gap for air venting (as shown in FIG. 3A and FIG. 3B).

To make the invention more understandable, the method for encapsulating an FPD 5 of the invention is described in greater detail herein below.

Figure 5:
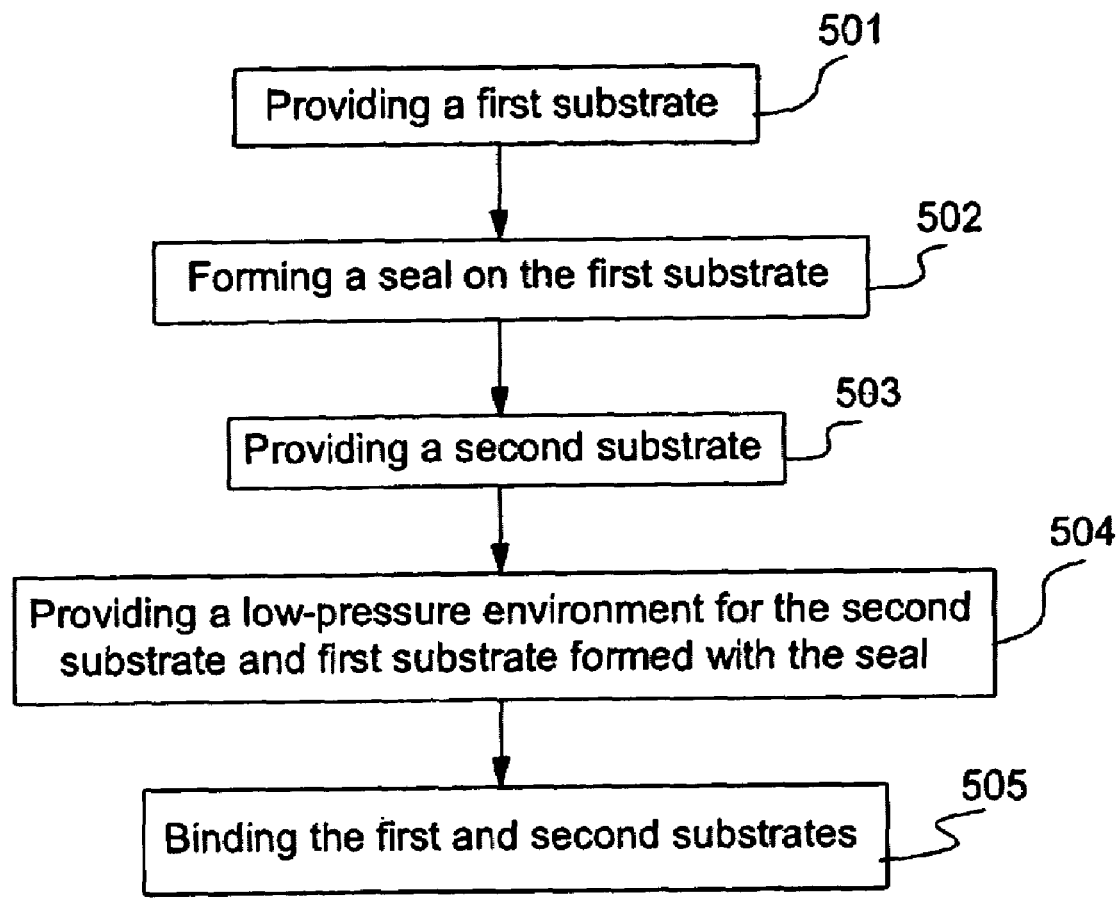
FIG. 5 is a flow chart showing a method for encapsulating an FPD according to a preferred embodiment of the invention.

With reference to FIG. 5, a step 501 provides a first substrate, and a step 502 then forms an adhesive on the first substrate. A step 503 provides a second substrate, and a step 504 provides a low-pressure environment for the second substrate and the first substrate formed with the adhesive. Finally, a step 505 presses the first substrate and/or the second substrate to bind the first and second substrates.

The method 5 can be performed in the previous-mentioned FPD encapsulation apparatus 4.

Figure 6A:
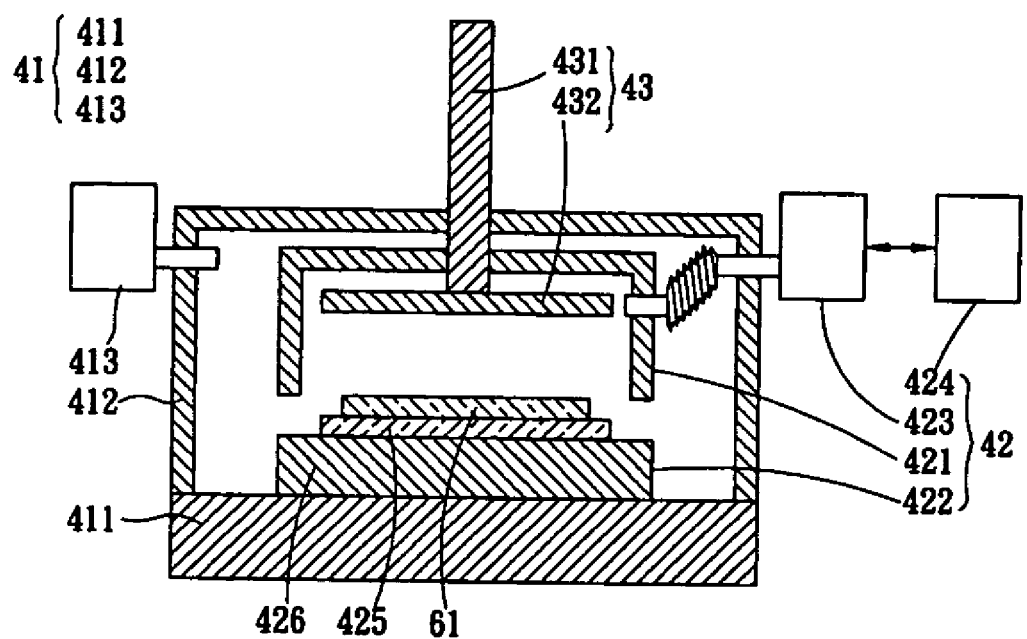
FIGS. 6A to 6E are schematic illustrations showing the FPD encapsulation apparatus of FIG. 4 performing the method of FIG. 5.

Referring to FIG. 6A, the first substrate 61 is placed on the supporting portion 425 in step 501. In the embodiment, this step may cooperate with a robot arm (not shown) to move the first substrate 61 into the chamber 41 and position the first substrate 61 on the supporting portion 425.

Figure 6B:
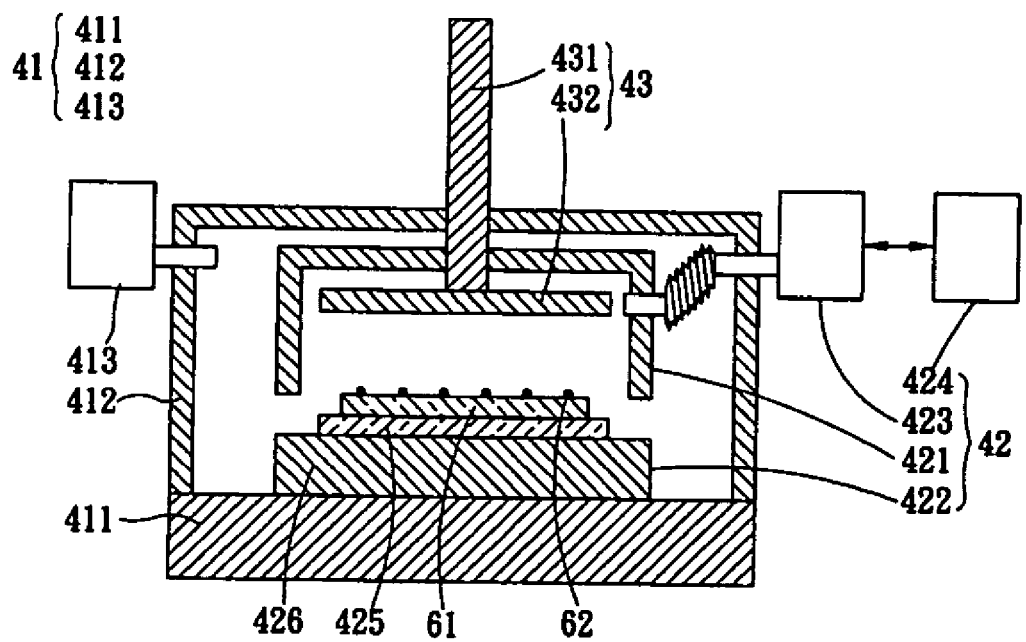

Referring to FIG. 6B, a dispensing mechanism (not shown) is used to form an adhesive 62 on the first substrate 61 (step 502). In the embodiment, the adhesive 62 can be made of epoxy, and it can be a closed loop or frame or have a gap for air venting (as shown in FIG. 3A and FIG. 3B).

As mentioned above, the adhesive 62 can be dispensed on the first substrate 61 with an additional dispensing apparatus. The first substrate 61 with the adhesive 62 is then moved into the chamber 41 and positioned on the supporting portion 425. After the first substrate 61 with adhesive 62 is positioned on the supporting portion 425, an UV light source 426 emits an UV light beam. The UV light beam passes through the supporting portion 425 and the first substrate 61 to pre-cure the adhesive 62.

Figure 6C:
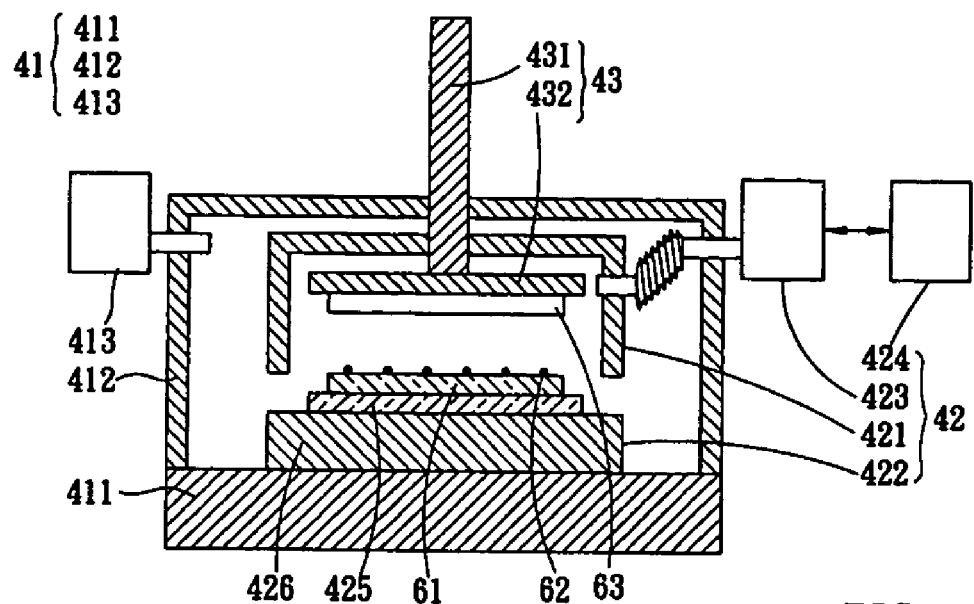

With reference to FIG. 6C, a second substrate 63 is set and held at one end of the pressing mechanism 43 (step 503). In this embodiment, a robot arm (not shown) is used to move the second substrate 63 into the chamber 41 and to position the second substrate 63 on one end of the pressing mechanism 43, which is the attaching portion 432. As mentioned above, the attaching portion 432 can be a mechanical chuck for chucking the second substrate 63 or a vacuum suction plate for holding the second substrate 63.

Figure 6D:
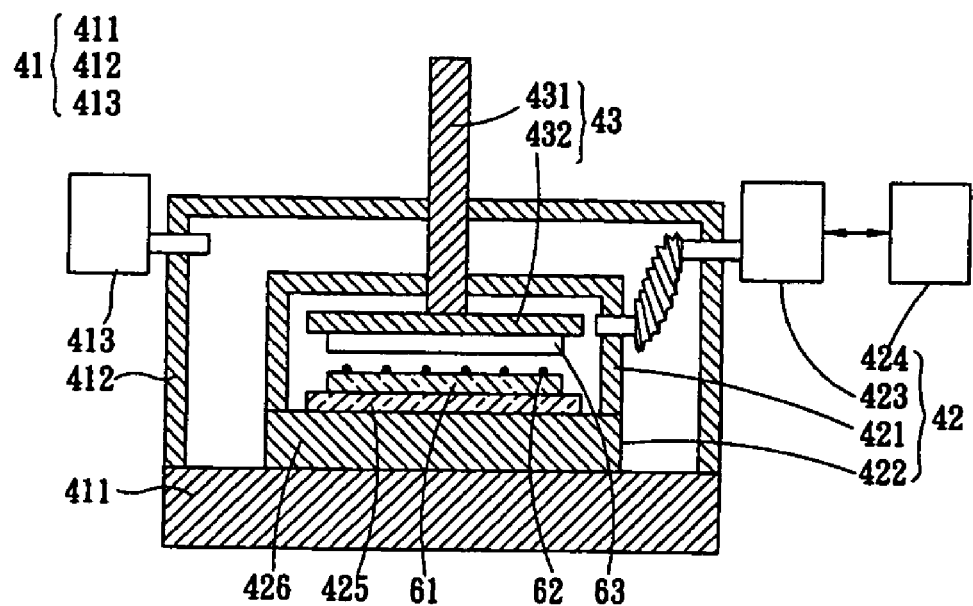

Referring to FIG. 6D, the housing 421 is moved down and contacts the curing device 422. Thus, the housing 421 and the curing device 422 can form an operating space, in which the first substrate 61, adhesive 62 and second substrate 63 are positioned. It should be noted that before the housing 421 is moved down, an atmosphere controlling mechanism 413 may control and input inert gas into the airtight space formed by the basement 411 and shielding 412. Thus, the moisture and oxygen of the airtight space can be decreased.

The controlling device 424 controls the vacuum pump of the vacuum device 423 according to an input predetermined pressure value, such as 100 to 600 torr. The vacuum pump can then vent the air out of the operating space constructed by the housing 421 and the curing device 422 to obtain a low-pressure environment. The exhausted air includes the inert gas input into the airtight space in advance and harmful volatile materials released from the adhesive 62.

Figure 6E:
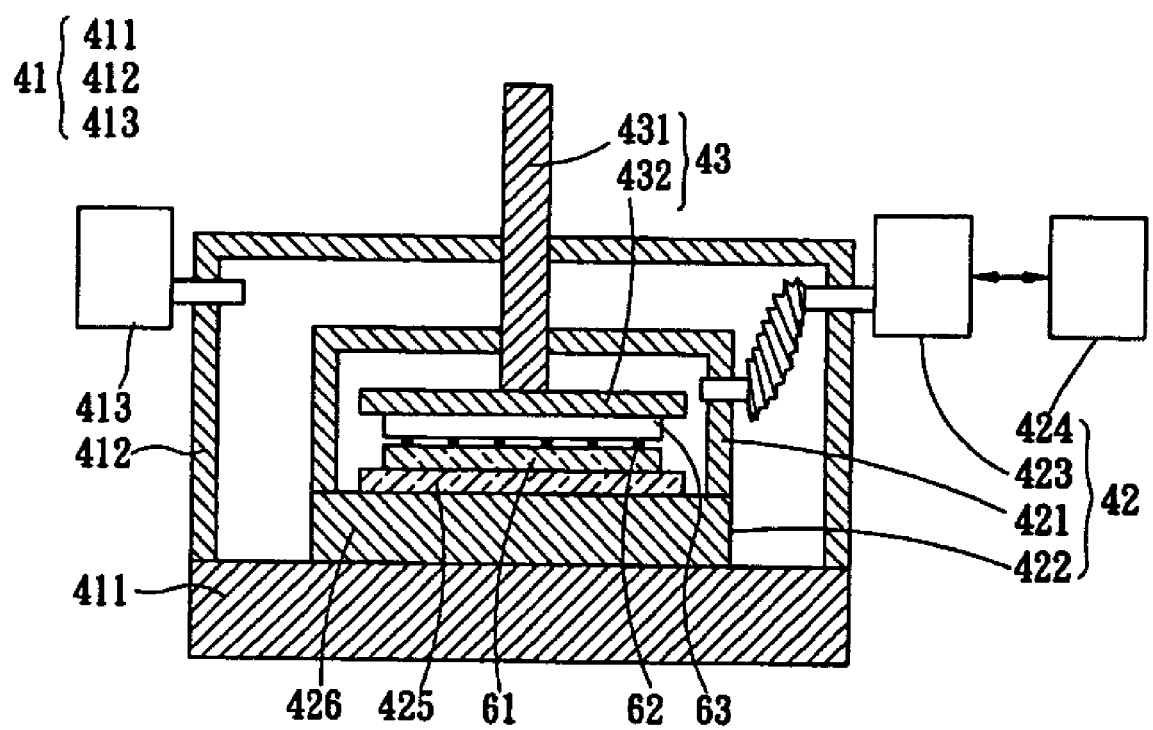

As shown in FIG. 6E, the pressing mechanism 43 moves down to press the second substrate 63 for binding the first substrate 61 and second substrate 63. Wherein, the first substrate 61 and the second substrate 63 are bound via the adhesive 62. In the current embodiment, the second substrate 63 is aligned with the first substrate 61 in advance. The pressing mechanism 43 can be screwed down or pneumatically moved down. After binding the first substrate 61 and second substrate 63, the UV light source 426 of the curing device 422 then emits an UV light beam to cure the adhesive 62.

In the method 5, the pressure of the space consisting of the first substrate 61, second substrate 63 and adhesive 62 can be controlled with the controlling device 424. Therefore, after the pressing process, the pressure of this space will be smaller than prior, and is usually slightly larger than 760 torr (1 atmosphere). As a result, when the manufactured device is tested with high temperature, the pressure of the residual air in this space would not increase too much. Thus, the structure of the first substrate 61, second substrate 63 and adhesive 62 would not be damaged according to the expanded air.

In this embodiment, the first substrate 61 can be a cover substrate, and the second substrate 63 can be an electroluminescent substrate. In addition, the first substrate 61 can be an electroluminescent substrate, and the second substrate 63 can be a cover substrate. For example, the cover substrate is a glass substrate, and the electroluminescent substrate is an organic electroluminescent substrate.

In summary, since the FPD encapsulation apparatus and method for encapsulating the FPD provide a low-pressure environment in advance, and then bind the first and second substrates, the pressure between the first substrate, adhesive and second substrate can be controlled efficiently. Thus, the high pressure caused by air expansion can be prevented, so that the encapsulated structure of the first substrate, adhesive, and second substrate would not be destroyed. Accordingly, the durability of the manufactured FPD is improved. Furthermore, the bubbles or worm holes would not be obtained, so that the external moisture and oxygen would not pass through the adhesive easily. Therefore, the manufactured FPD would not be damaged by the external moisture or oxygen. Moreover, the invention can vent residual harmful volatile materials to prevent the manufactured FPD from damaged by the harmful volatile materials. Thus, the dark spot is prevented, and the durability of the manufactured FPD is enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A flat-panel display (FPD) encapsulation apparatus, at least comprising:
   a chamber having an airtight space, the chamber comprising:
      a housing received in the airtight space;
      a curing device disposed next to the housing and having a supporting portion to support a first substrate, wherein the curing device and the housing form an operating space; and
      a vacuum device, adapted for decreasing the pressure of the operating space down to lower than 1 atmosphere; and
   a pressing mechanism disposed within the chamber, wherein the pressing mechanism is operated in the operating space and connected to the housing; and a second substrate is provided in the housing and attached to one end of the pressing mechanism, the second substrate being movable in the housing according to the pressing mechanism.

2. The encapsulation apparatus of claim 1, wherein the chamber further comprises:
   a controlling device, which controls the vacuum device to adjust the pressure of the operating space.

3. The encapsulation apparatus of claim 1, further comprising:
   a dispensing mechanism, which forms an adhesive on the first substrate.

4. The encapsulation apparatus of claim 1, further comprising:
   an atmosphere controlling mechanism, which controls moisture and oxygen in the airtight space.

5. The encapsulation apparatus of claim 1, wherein the atmosphere controlling mechanism inputs inert gas into the airtight space to control moisture and oxygen in the airtight space.

6. A flat-panel display (PPD) encapsulation apparatus, comprising:
   a chamber comprising:
      a basement;
      a shielding, the basement and the shielding forming an airtight space and being able to stop UV light from penetrating out therefrom;
      an atmosphere controlling mechanism operationally connected to the shielding for controlling and inputting an inert gas into the airtight space;
      a housing received in the airtight space;
      a curing device, cooperatively forming an operating space with the housing, the curing device further comprising a supporting portion and an UV light source disposed one on another; and
      a vacuum device configured for venting air from the operating space to maintaining a pressure therein lower than 1 atmosphere; and
   a pressing mechanism disposed within the chamber, operated in the operating space and connected to the housing.

* * * * *